(12) United States Patent
Kwant et al.

(10) Patent No.: US 11,449,768 B2
(45) Date of Patent: *Sep. 20, 2022

(54) METHOD, APPARATUS, AND SYSTEM FOR PROVIDING A REDUNDANT FEATURE DETECTION ENGINE

(71) Applicant: HERE Global B.V., Eindhoven (NL)

(72) Inventors: Richard Kwant, Oakland, CA (US);
Anish Mittal, Berkeley, CA (US);
David Lawlor, Chicago, IL (US);
Zhanwei Chen, Oakland, CA (US);
Himaanshu Gupta, San Francisco, CA (US)

(73) Assignee: HERE Global B.V., Eindhoven (NL)

( * ) Notice: Subject to any disclaimer, the term of this patent is extended or adjusted under 35 U.S.C. 154(b) by 469 days.

This patent is subject to a terminal disclaimer.

(21) Appl. No.: 16/700,662

(22) Filed: Dec. 2, 2019

(65) Prior Publication Data

US 2020/0104727 A1 Apr. 2, 2020

Related U.S. Application Data

(63) Continuation of application No. 15/878,108, filed on Jan. 23, 2018, now Pat. No. 10,535,006.

(51) Int. Cl.
*G06N 5/02* (2006.01)
*G06N 3/08* (2006.01)
(Continued)

(52) U.S. Cl.
CPC .......... *G06N 5/022* (2013.01); *G06K 9/6218* (2013.01); *G06N 3/08* (2013.01); *G06T 7/11* (2017.01);
(Continued)

(58) Field of Classification Search
CPC ........ G06N 5/022; G06N 3/08; G06N 3/0454; G06K 9/6218; G06K 9/6267; G06T 7/11;
(Continued)

(56) References Cited

U.S. PATENT DOCUMENTS 9,483,701 B1 11/2016 Kwatra et al.
2010/0034466 A1 2/2010 Jing et al.
(Continued)

FOREIGN PATENT DOCUMENTS

EP 2993623 A1 3/2016

OTHER PUBLICATIONS

Ommer et al., "Multi-scale Object Detection by Clustering Lines", Published in 2009 IEEE 12th International Conference on Computer Vision, retrieved on Dec. 17, 2017 from https://www2.eecs.berkeley.edu/Research/Projects/CS/vision/shape/ommer_cvl_iccv09.pdf, 8 pages.

(Continued)

*Primary Examiner* — John B Strege
(74) *Attorney, Agent, or Firm* — Ditthavong, Steiner & Mlotkowski

(57) ABSTRACT

An approach is provided for a redundant feature detection engine. The approach, for instance, involves segmenting an input image into a plurality of grid cells for processing by the redundant feature detection engine. The redundant feature detection engine includes a neural network. The approach also involves, for each of the plurality of grid cells, initiating a prediction of an object code by the redundant feature detection engine. The object code is a predicted feature that uniquely identifies an object depicted in the input image. The approach further involves aggregating the plurality of grid cells into one or more clusters based on the object code predicted for said each grid cell. The approach further involves predicting one or more features of the object corresponding to a respective cluster of the one or more (Continued)

clusters by merging one or more feature prediction outputs of said each grid cell in the respective cluster.

20 Claims, 16 Drawing Sheets

(51) Int. Cl.
  *G06T 7/70* (2017.01)
  *G06T 7/11* (2017.01)
  *G06K 9/62* (2022.01)
  *G06T 7/73* (2017.01)
  *G06T 7/77* (2017.01)
  *G06V 30/194* (2022.01)

(52) U.S. Cl.
  CPC ............... *G06T 7/70* (2017.01); *G06T 7/73* (2017.01); *G06T 7/77* (2017.01); *G06V 30/194* (2022.01); *G06T 2207/10016* (2013.01); *G06T 2207/10024* (2013.01); *G06T 2207/10048* (2013.01); *G06T 2207/20021* (2013.01); *G06T 2207/20081* (2013.01); *G06T 2207/20084* (2013.01); *G06T 2207/30248* (2013.01); *G06T 2207/30256* (2013.01); *G06T 2207/30261* (2013.01)

(58) Field of Classification Search
  CPC .... G06T 7/70; G06T 7/73; G06T 7/77; G06T 2207/10016; G06T 2207/10024; G06T 2207/10048; G06T 2207/20021; G06T 2207/20081; G06T 2207/20084; G06T 2207/30248; G06T 2207/30256; G06T 2207/30261; G06V 30/194; G06V 10/50; G06V 10/82; G06V 20/582
  See application file for complete search history.

(56) References Cited

U.S. PATENT DOCUMENTS

| | | |
|---|---|---|
| 2014/0372442 A1 | 12/2014 | Cilibrasi et al. |
| 2016/0259970 A1 | 9/2016 | Wee et al. |
| 2019/0049239 A1* | 2/2019 | Natroshvili ............ G01N 15/10 |
| 2019/0130188 A1* | 5/2019 | Zhou ..................... G06K 9/6227 |
| 2021/0366150 A1* | 11/2021 | Mittal ................... G06V 20/588 |
| 2022/0067406 A1* | 3/2022 | Hotson .................. G08G 1/096 |

OTHER PUBLICATIONS

Higa et al., "Multiple Object Identification Using Grid Voting of Object Center Estimated From Keypoint Matches", 2013, published in 2013 20th IEEE International Conference on Image Processing, retrieved on Dec. 17, 2017 from http://f4k.dieei.unict.it/proceedings/ICIP2013/pdfs/0002973.pdf, pp. 2973-2977.

* cited by examiner

METHOD, APPARATUS, AND SYSTEM FOR PROVIDING A REDUNDANT FEATURE DETECTION ENGINE

RELATED APPLICATION

This application claims priority to and is a continuation patent application of U.S. patent application Ser. No. 15/878,108, filed Jan. 23, 2018, titled "Method, Apparatus, and System for Providing a Redundant Feature Detection Engine," the contents of which are herein incorporated by reference in their entirety.

BACKGROUND

Advances in available computer power have enabled the development of computer vision systems through machine learning systems with feature detection engines employing neural networks. In computer vision applications, traditional neural networks generally mimic a biological eye by dividing an input image into individual receptive fields (e.g., grid cells of image pixels) that are then processed by respective neurons or processing nodes of the neural network. However, the segmentation of the input image can also create technical challenges for image recognition when an object or feature spans multiple receptive fields or grid cells because the neural network would have to reconcile multiple predictions of the same object.

SOME EXAMPLE EMBODIMENTS

Therefore, there is a need for an approach for providing a redundant feature detection engine that provides more redundant and more robust feature predictions when processing images in discrete sections (e.g., image sections or grid cells corresponding to the receptive field of individual neurons of a neural network).

According to one embodiment, a computer-implemented method for providing a redundant feature detection engine comprises segmenting an input image into a plurality of grid cells for processing by the redundant feature detection engine. The redundant feature detection engine, for instance, includes a neural network. The method also comprises for each of the plurality of grid cells, initiating a prediction of an object code by the redundant feature detection engine. In one embodiment, the object code is a predicted feature (e.g., a polygon centroid) that uniquely identifies an object depicted in the input image. The method further comprises aggregating the plurality of grid cells into one or more clusters based on the object code predicted for said each grid cell. The method further comprises predicting one or more features of the object corresponding to a respective cluster of the one or more clusters by merging one or more feature prediction outputs of said each grid cell in the respective cluster.

According to another embodiment, an apparatus for providing a redundant feature detection engine comprises at least one processor, and at least one memory including computer program code for one or more computer programs, the at least one memory and the computer program code configured to, with the at least one processor, cause, at least in part, the apparatus to segment an input image into a plurality of grid cells for processing by the redundant feature detection engine. The redundant feature detection engine, for instance, includes a neural network. The apparatus also is caused to, for each of the plurality of grid cells, initiating a prediction of an object code by the redundant feature detection engine. In one embodiment, the object code is a predicted feature that uniquely identifies an object depicted in the input image. The apparatus is further caused to cluster the plurality of grid cells into one or more clusters based on the object code predicted for said each grid cell. The apparatus is further caused to predict one or more features of the object corresponding to a respective cluster of the one or more clusters by merging one or more feature prediction outputs of said each grid cell in the respective cluster.

According to another embodiment, a non-transitory computer-readable storage medium for providing a redundant feature detection engine carries one or more sequences of one or more instructions which, when executed by one or more processors, cause, at least in part, an apparatus to segment an input image into a plurality of grid cells for processing by the redundant feature detection engine. The redundant feature detection engine, for instance, includes a neural network. The apparatus also is caused to, for each of the plurality of grid cells, initiating a prediction of an object code by the redundant feature detection engine. In one embodiment, the object code is a predicted feature that uniquely identifies an object depicted in the input image. The apparatus is further caused to cluster the plurality of grid cells into one or more clusters based on the object code predicted for said each grid cell. The apparatus is further caused to predict one or more features of the object corresponding to a respective cluster of the one or more clusters by merging one or more feature prediction outputs of said each grid cell in the respective cluster.

According to another embodiment, an apparatus for providing a redundant feature detection engine comprises means for segmenting an input image into a plurality of grid cells for processing by the redundant feature detection engine. The redundant feature detection engine, for instance, includes a neural network. The apparatus also comprises means for each of the plurality of grid cells, initiating a prediction of an object code by the redundant feature detection engine. In one embodiment, the object code is a predicted feature that uniquely identifies an object depicted in the input image. The apparatus further comprises means for aggregating the plurality of grid cells into one or more clusters based on the object code predicted for said each grid cell. The apparatus further comprises means for predicting one or more features of the object corresponding to a respective cluster of the one or more clusters by merging one or more feature prediction outputs of said each grid cell in the respective cluster.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a redundant feature detection engine are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
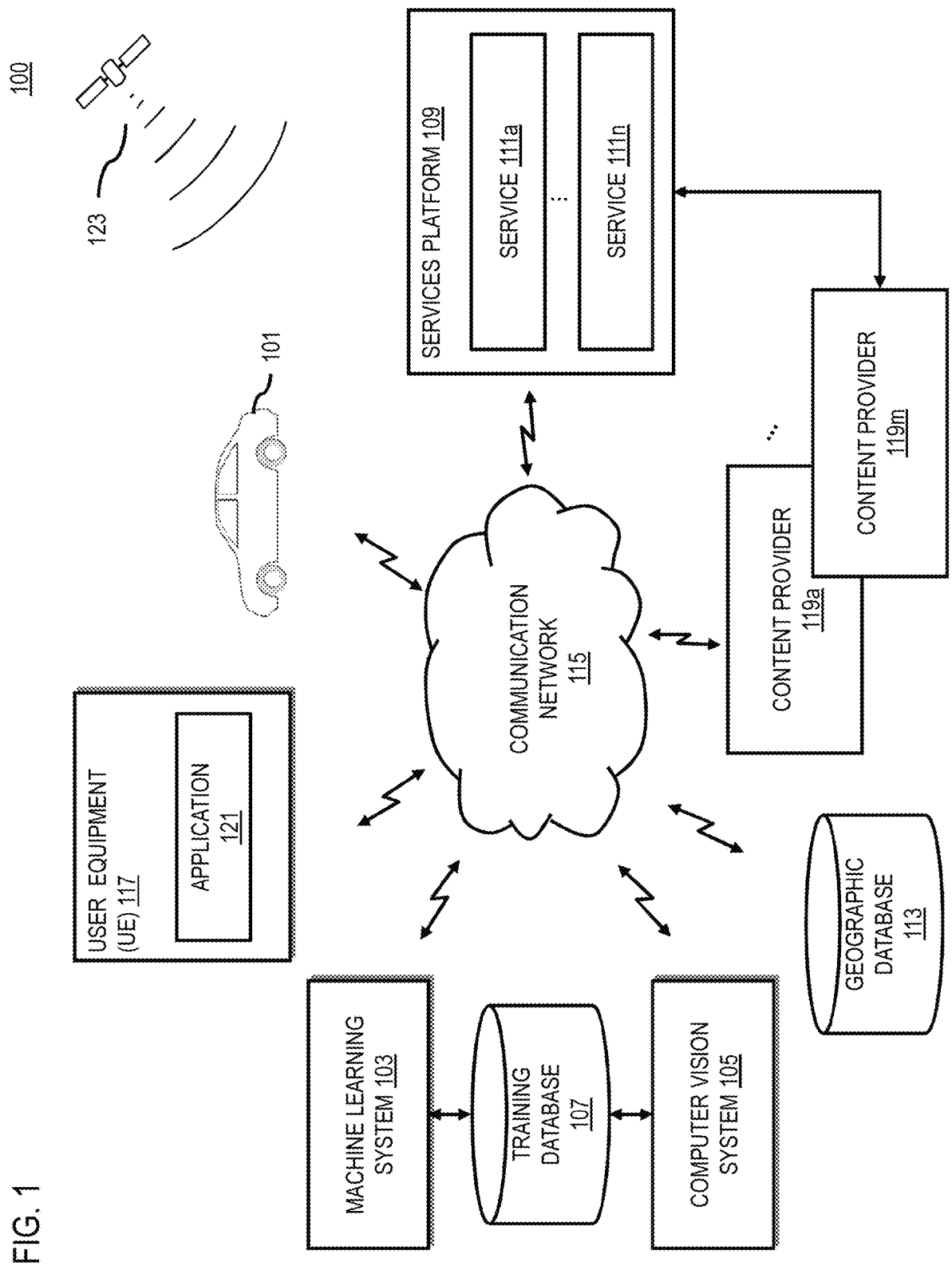
FIG. 1 is a diagram of a system capable of providing a redundant feature detection engine, according to one embodiment.

FIG. 1 is a diagram of a system capable of providing a redundant feature detection engine, according to one embodiment. As noted above, machine learning-based computer vision systems have enabled a variety of object recognition based services and applications. For example, autonomous driving has quickly become an area of intense interest, with recent advances in machine learning, computer vision and computing power enabling real-time mapping and sensing of a vehicle's environment. Such an understanding of the environment enables autonomous, semi-autonomous, or highly assisted driving in a vehicle (e.g., a vehicle 101) in at least two distinct ways.

First, real-time sensing of the environment provides information about potential obstacles, the behavior of others on the road, and safe, drivable areas. An understanding of where other cars are and what they might do is critical for a vehicle 101 to safely plan a route. Moreover, vehicles 101 generally must avoid both static (lamp posts, e.g.) and dynamic (cats, deer, e.g.) obstacles, and these obstacles may change or appear in real-time. More fundamentally, vehicles 101 can use a semantic understanding of what areas around them are navigable and safe for driving. Even in a situation where the world is completely mapped in high resolution, exceptions will occur in which a vehicle 101 might need to drive off the road to avoid a collision, or where a road's geometry or other map attributes like direction of travel have changed. In this case, detailed mapping may be unavailable, and the vehicle 101 has to navigate using real-time sensing of road features or obstacles using a computer vision system (e.g., a machine learning system 103 in combination with a computer vision system 105).

A second application of vision techniques in autonomous driving is localization of the vehicle 101 with respect to a map of reference landmarks. Understanding one's location on a map enables planning of a route, both on fine and coarse scales. On a coarse scale, navigation maps allow vehicles 101 to know what roads to use to reach a particular destination. However, on a finer scale, maps allow vehicles 101 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to a map enables the incorporation of other real-time information into route planning. Such information could include traffic, areas with unsafe driving conditions (ice, fog, potholes, e.g.), and temporary road changes like construction.

Figure 2A:
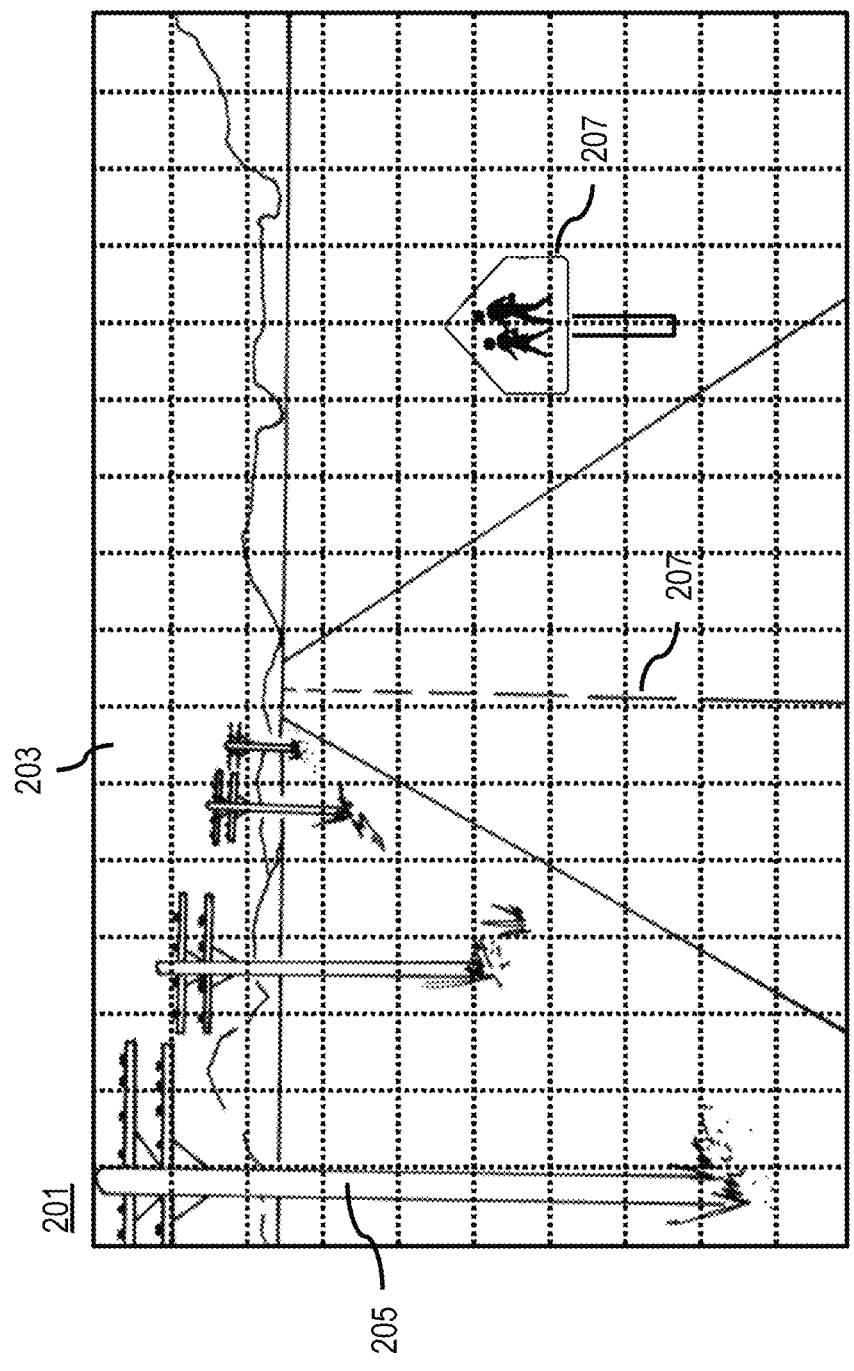
FIGS. 2A-2B are diagrams illustrating an example input image divided into grid cells, according to one embodiment.

In one embodiment, the machine learning system 103 can employ a neural network in combination with the computer vision system 105 to enable autonomous driving (as described above) and other image recognition based applications. A natural representation for regressing features for a neural network is based on a grid with the same aspect ratio as the input image. Such a grid, for instance, can be output by a fully convolutional neural network. FIG. 2A is a diagram illustrating an example input image 201 divided into grid cells 203, according to one embodiment. In this example, the input image 201 depicts a scene captured from a camera sensor mounted on a vehicle 101 traveling on a road. The input image 201, for instance, can be used for vehicle localization as described above based on recognizing objects or road features depicted in the image (e.g., pole 205, road sign 207, lane markings 207, etc.).

Figure 2B:
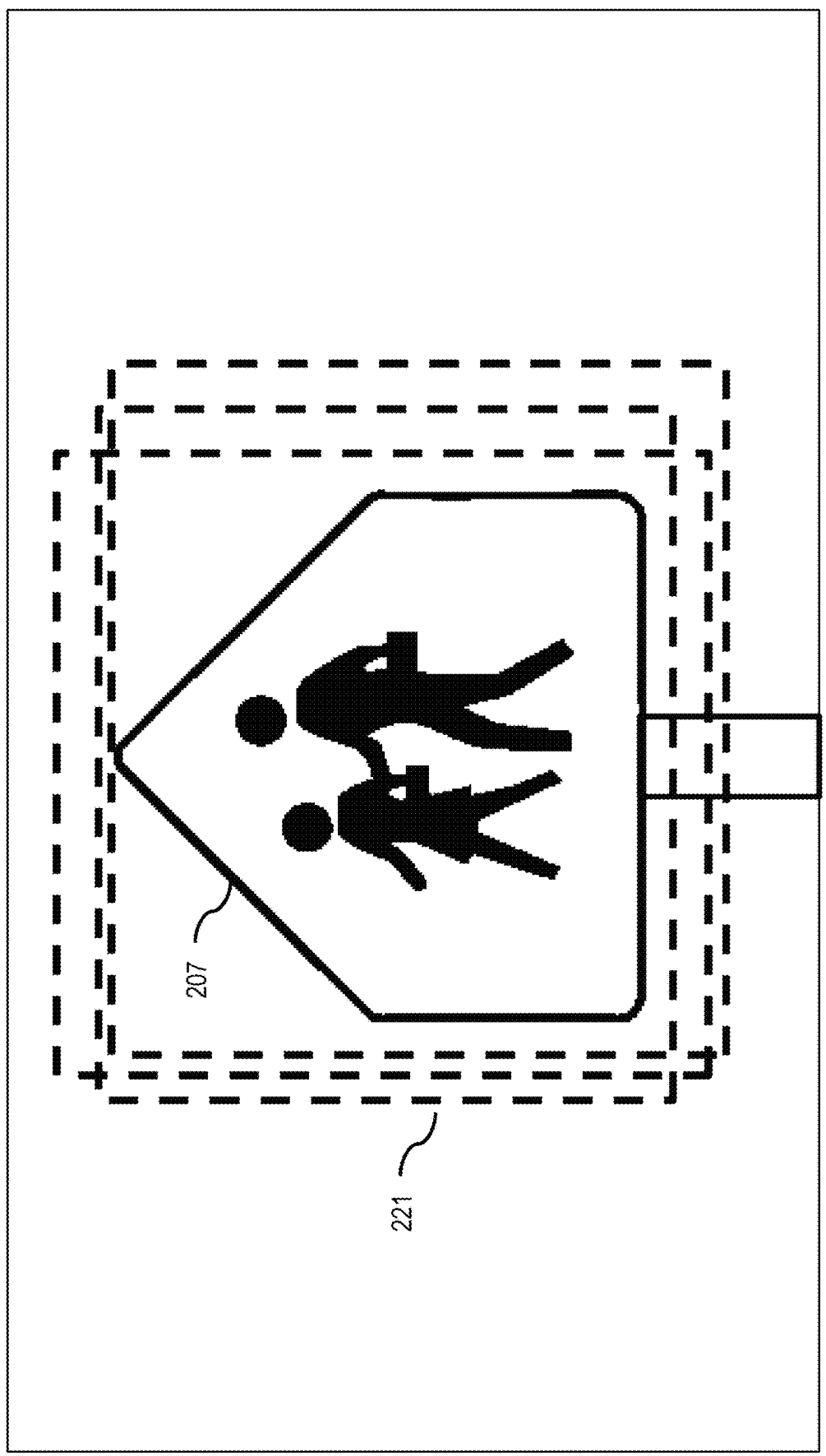

However, as shown, many of these objects or features span multiple grid cells. Therefore, to fully exploit the capability of such a grid representation of input images, service providers face significant technical challenges to predict road features using all the cells that span the object. For example, the sign 207 spans multiple grid cells of the input image 201. One traditional approach to providing prediction using all spanned grid cells is non-maximal suppression. This traditional approach takes multiple polygon detections of the same object and merges the polygon detections in post processing based on the area overlap. An example of this traditional non-maximal suppression approach is shown in FIG. 2B. In the example of FIG. 2B, the sign 207 depicted in the input image 201 of FIG. 2A has been recognized through multiple polygon detections 221. Each of the multiple polygon detections 221 is a separate detection instance in which a machine learning system has identified a polygon that encompasses the entire object (e.g., the entire sign 207) to predict the object's features. The multiple polygon detections 221 are then merged as previously described to output a prediction of the sign 207 based on the non-maximal approach.

This traditional non-maximal suppression approach, however, has several limitations that present significant technical challenges to overcome. For example, the traditional non-maximal suppression approach can fail if multiple objects are to be detected are close enough to each other that the borders of the multiple polygon detections for the separate objects overlap. Another limitation is that the merging used by the traditional non-maximal suppression approach relies on the multiple detections making accurate predictions of the object geometry themselves so that their respective polygons can cover the entire object. In addition, since the detections are merged later, the loss function in a machine learning paradigm that employs non-maximal suppression cannot enforce detection consistency.

To address these technical challenges, a system 100 of FIG. 1 introduces a capability to provide a redundant feature detection engine that uses object codes to cluster individual prediction outputs from each grid cell of an input image to represent multiple or redundant predictions of the detected objects. In one embodiment, the object code is a predicted feature that is unique to every object in the image. This object code, for instance, can be predicted by the redundant feature detection engine (e.g., implemented in the machine learning system 103) as part of the feature prediction output for each grid cell of the input image. Examples of the predicted features that can be used as objects include, but are not limited to: a predicted polygon centroid, perimeter length, dimensions, etc. of the object. In some embodiments, the object code can also be an abstract feature vector that only the redundant feature detection engine understands.

In other words, the system 100 can use the redundant feature detection engine to predict which of the grid cells of the input image belong to an individual object depicted input image by predicting their object codes. Because the object codes are predicted independently for each grid cell, the geometry of the object need not be known to the system 100. Grid cells with the same or similar object codes can then be aggregated as belonging to a common object. In one embodiment, the multiple feature predictions from each of the aggregated grid cells are merged to provide a redundant feature prediction for the same object. By using the embodiments of the redundant feature described herein, the system 100 provides multifold advantages such as, but not limited to: (1) multiple predictions act as validation check and reduce the noise in prediction; (2) better chances of getting the feature detection since there are multiple cells predicting it; and (3) ability to use a more constrained loss function that enforces object consistency amongst cells that predict it.

Figure 3:
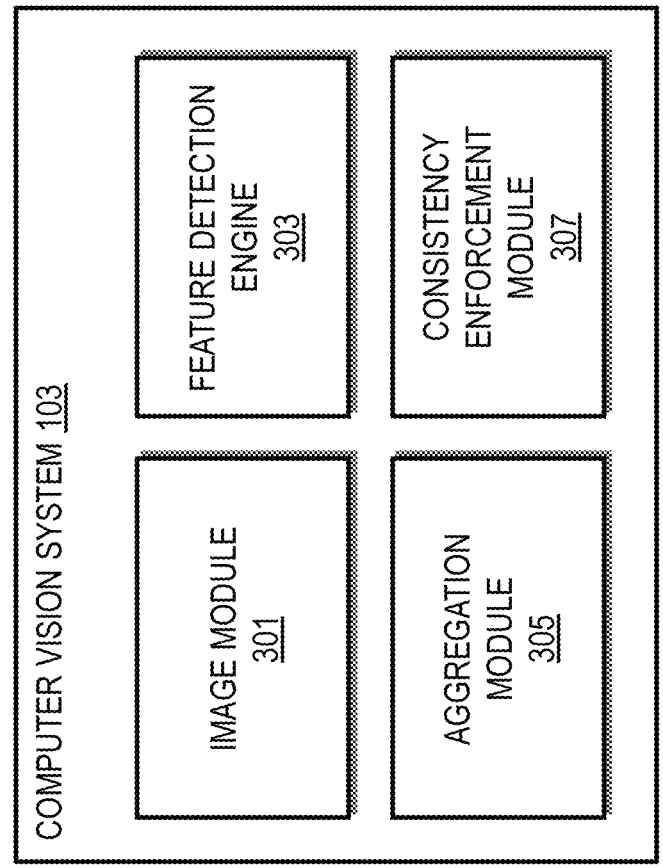
FIG. 3 is a diagram of the components of a computer vision system including a feature detection engine, according to one embodiment.

FIG. 3 is a diagram of the components of a machine learning system 103 including a redundant feature detection engine, according to one embodiment. By way of example, the machine learning system 103 includes one or more components for providing a redundant feature detection engine according to the various embodiments described herein. It is contemplated that the functions of these components may be combined or performed by other components of equivalent functionality. In this embodiment, the machine learning system 103 includes an image module 301, a feature detection engine 303, an aggregation module 305, and a consistency enforcement module 307. The above presented modules and components of the machine learning system 103 can be implemented in hardware, firmware, software, or a combination thereof. Though depicted as a separate entity in FIG. 1, it is contemplated that the machine learning system 103 may be implemented as a module of any of the components of the system 100 (e.g., a component of computer vision system 105, services platform 109, services 111a-111n (also collectively referred to as services 111), etc.). In another embodiment, one or more of the modules 301-307 may be implemented as a cloud based service, local service, native application, or combination thereof. The functions of the machine learning system 103 and the modules 301-307 are discussed with respect to FIGS. 4-9B below.

Figure 4:
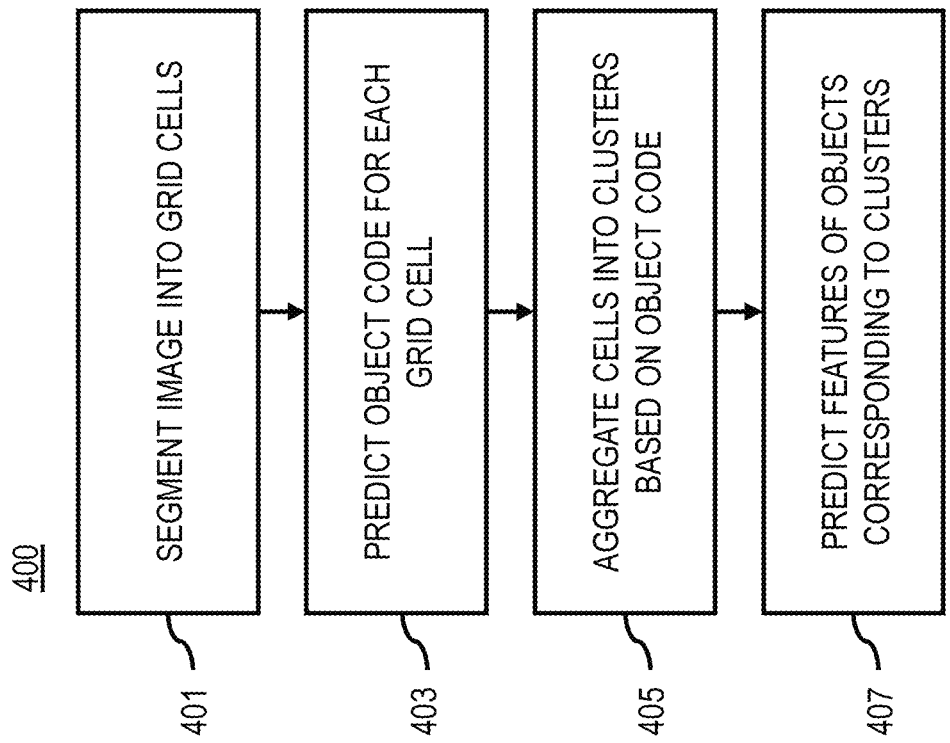
FIG. 4 is a flowchart of a process for providing a redundant feature detection engine, according to one embodiment.
Figure 12:
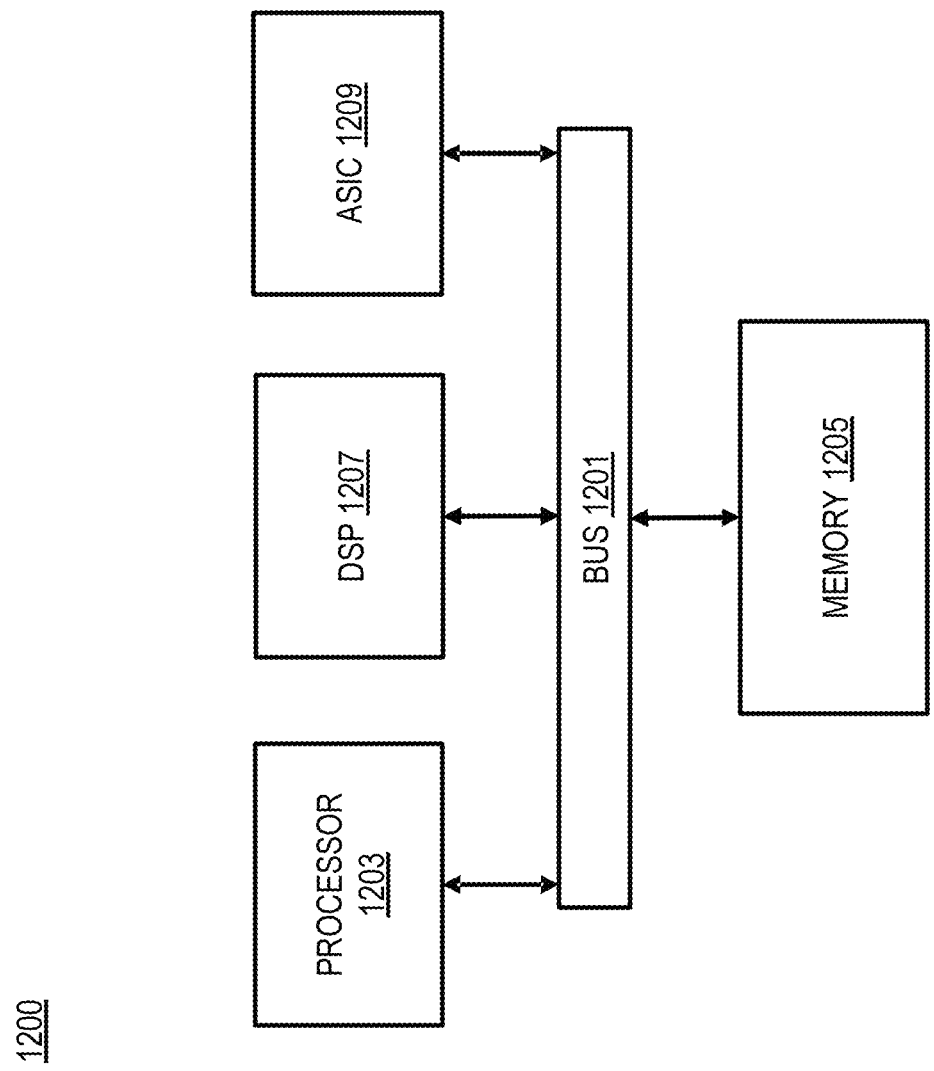
FIG. 12 is a diagram of a chip set that can be used to implement an embodiment of the invention.

FIG. 4 is a flowchart of a process for providing a redundant feature detection engine, according to one embodiment. In various embodiments, the machine learning system 103 and/or any of the modules 301-307 of the machine learning system 103 may perform one or more portions of the process 400 and may be implemented in, for instance, a chip set including a processor and a memory as shown in FIG. 12. As such, the machine learning system 103 and/or the modules 301-307 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In step 401, the image module 301 segments an input image into a plurality of grid cells for processing by the redundant feature detection engine 303. In one embodiment, the redundant feature detection engine 303 includes a neural network (e.g., a neural network whose neurons or processing nodes have receptive fields corresponding to respective grid cells of the input image). As noted above, a grid of cells is a natural representation for processing images by a neural network. However, it is contemplated that any type of segmentation of the image can be used including different cell shapes, non-uniform or adaptive cell shapes or sizes, etc., or equivalent can be used according to embodiments described herein.

After segmenting the input image, the feature detection engine 303 initiates a prediction of an object code by the redundant feature detection engine for each of the grid cells of the input image (step 403). In one embodiment, the object code is a hash tag that uniquely identifies an object depicted in the input image. The object, for instance, spans multiple cells of the plurality of grid cells, so multiple predictions can be made for the object. In this way, each prediction can be made by a neuron of the neural network of the feature detection engine 303 that corresponds to the respective grid cell.

In one embodiment, the feature detection engine 303 selects the object code from among a plurality of available attributes based on a learnability of the object code by the redundant feature detection engine 303, an availability of the object code for training of the redundant feature detection engine 303, a uniqueness of the object code with respect to the input image, or a combination thereof.

For example, learnability of the of the object code refers to whether the machine learning system can be trained to predict the object codes from an input set of features representing the characteristics of the input image corresponding to the grid cells. This learnability can depend, for instance, on the availability of training images labeled with ground truth values for the object code. In other words, the attribute or attributes selected on which the object code should also have a sufficient amount of training data in which the selected attributes are annotated. The feature detection engine 303 can then be trained using the annotated data to predict the selected object code attribute with a target level of accuracy. If the target level of accuracy cannot be achieved, then the object code can be classified as not learnable based on the available training data.

In one embodiment, the object code can be any attribute that can be predicted by the feature detection engine 303. For example, in one embodiment, a simple object code could be object location because objects are usually distributed throughout space. In another embodiment, the object code can be based on predicted centroid of a polygon representing the object. For example, in this embodiment, the feature detection engine 303 can be trained to predict the edges of objects depicted in the portion of the input image corresponding a respective grid cell. Because the object likely spans multiple grid cells, the predicted edge also likely represents only a portion of the recognized object or feature. As a result, it is unlikely that the entire object would fit in the image area of the grid cell. In this case, the feature prediction would predict the edge (e.g., using the edge detection procedure and representation described in more detail below) as well as polygonal representation of the entire object and its corresponding predicted centroid. If multiple grids cells depict the same object, the predicted centroid from each grid cell of the corresponding object polygon should be the same or nearly the same (e.g., matching within a distance threshold) even when the predictions for each grid cell are made separately and independently. Therefore, the centroid would be a unique identifier of the object.

In another embodiment, the object code can be based on any other statistical property, geometric property, or a combination thereof of the object. By way of example, the statistical or geometric property includes, but is not limited to, an edge length, a perimeter, an area, or a combination thereof of the object. As with the centroid of a polygon, these properties can be unique attributes that are learnable or predictable by the feature detection engine 303. Other examples of the object code can be based on an attribute-based tag indicating a type, a color, a style, a texture, or a combination thereof of the object. For example, if the object is a road sign, the road sign can have different attributes such type (e.g., traffic sign, directional sign, etc.), shape (e.g., rectangular, square, octagonal, etc.), color (e.g., green, red, yellow, white, etc.), etc. that are unique to the sign. In yet another embodiment, the object code is an abstract feature representation learned by the redundant feature detection engine 303 (e.g., a neural network of the feature detection engine 303). These features, for instance, may not be human readable or recognizable because they are identified by the feature detection engine 303 during training. In any case, these abstract features can still be used provided they are learnable/trainable and unique to the objects in the input image.

In one embodiment, multiple attributes can serve as object hash tags or codes if they also satisfy the criteria of learnability, ease of availability for training, and uniqueness among the objects in the image. For example, the object code can be a hash tag based on the polygon centroid and color, or any other combination of available attributes. In this way, multiple attributes can be combined to improve learnability, availability for training, and/or uniqueness when compared to using a single or fewer attributes as the object code.

In step 405, the aggregation module 305 aggregates the plurality of grid cells into one or more clusters based on the object code predicted for said each grid cell. In other words, the object codes enable the prediction of the same object using all cells that are spanned by an object and provide a way for the aggregation module 305 to combine grid cells of the same object. Therefore, the aggregation or merging of the cells using object codes provides the advantage of not having to depend on or know the geometry of the object.

In one embodiment, aggregation of cells making predictions for the same physical object provides redundancy. This redundancy provides the further advantage of making detection of the object robust because even when a few cells fail to make a prediction, an object can still be detected. Accordingly, in step 407, the feature detection engine 303 predicts one or more features of the object corresponding to a respective cluster of the one or more clusters by merging one or more feature prediction outputs of said each grid cell in the respective cluster. In one embodiment, redundancy also reduces noise among multiple predictions for the same object. For example, after aggregation of the grid cells of the same object as determined from the object code, the feature detection engine 303 can calculate the mean or median values of predicted attributes (e.g., object coordinates) to find the most likely overall prediction to output (e.g., a prediction of the object's location for use in visual odometry or vehicle localization). In other words, the merging of the one or more feature predictions comprises computing a mean or a median of the one or more feature prediction outputs to determine the one or more features predicted by the redundant feature prediction model for the object.

It is noted that the use of the median or mean to merge the multiple predictions from the aggregated grid cells for the same object is provided as examples and not as limitations. It is contemplated that the merging can use any equivalent process for generating a representative prediction from the multiple predictions of the aggregated grid cells. For example, a voting scheme can be used so that the most common prediction is selected as the final output for the object detection. In other cases, other statistical operations can be performed to generate the consensus prediction such as outlier testing/removal, maximum, minimum, etc.

In one embodiment, redundancy also constrains the learning problem for the network. Learning can be difficult for neural networks because their parameters span a massive space. Therefore, constraints imposed by the loss function help to reduce the space of possible solutions and produce a trained network that can generalize better. Accordingly, the feature detection engine 303 interacts with the enforcement module 307 to enforce a consistency of the one or more feature prediction outputs of said each grid cell in the respective cluster to predict the one or more features of the object. For example, during training, the grid cells grouped according to labeled object codes so that the machine learning system 103 or neural network thereof can be constrained to predict features of the corresponding object. In other words, the loss function used for training can enforce the constraint that all aggregated grid cells with the same predicted object code should produce the same solution (e.g., by predicting the features of the same object), thereby advantageously improving the robustness of training by reducing the possible solutions for those grid cells. Similarly, when evaluating a trained feature detection engine 303, the enforcement module 307 can apply a similar constraint. In other words, the prediction of object codes enforces consistency amongst the multiple predictions of the aggregated grid cells to lead to more accurate predictions. The object code implicitly informs the machine learning system 103 of what grid cells constitute the object and enforces the predictions to be more consistent with each other.

In one embodiment, the machine learning system 101 can used the object codes as a straightforward way of counting the number objects in the image. For example, the number of different object codes predicted by the grid cells for an input image or set of input images can be used to estimate the number of different objects detected in the input image. When the input images are associated with a geographical area, the predicted codes for the geographical area can be indicative of the detectable objects in the area. This estimate can be helpful to get a sense of how many localization objects are available in different geographical areas. The estimate can also be used to determine whether the computer vision system 105 can rely on the objects for accurate localization (e.g., based on how many detections of the object were found, predicted features of the objects, etc.).

Figure 5A:
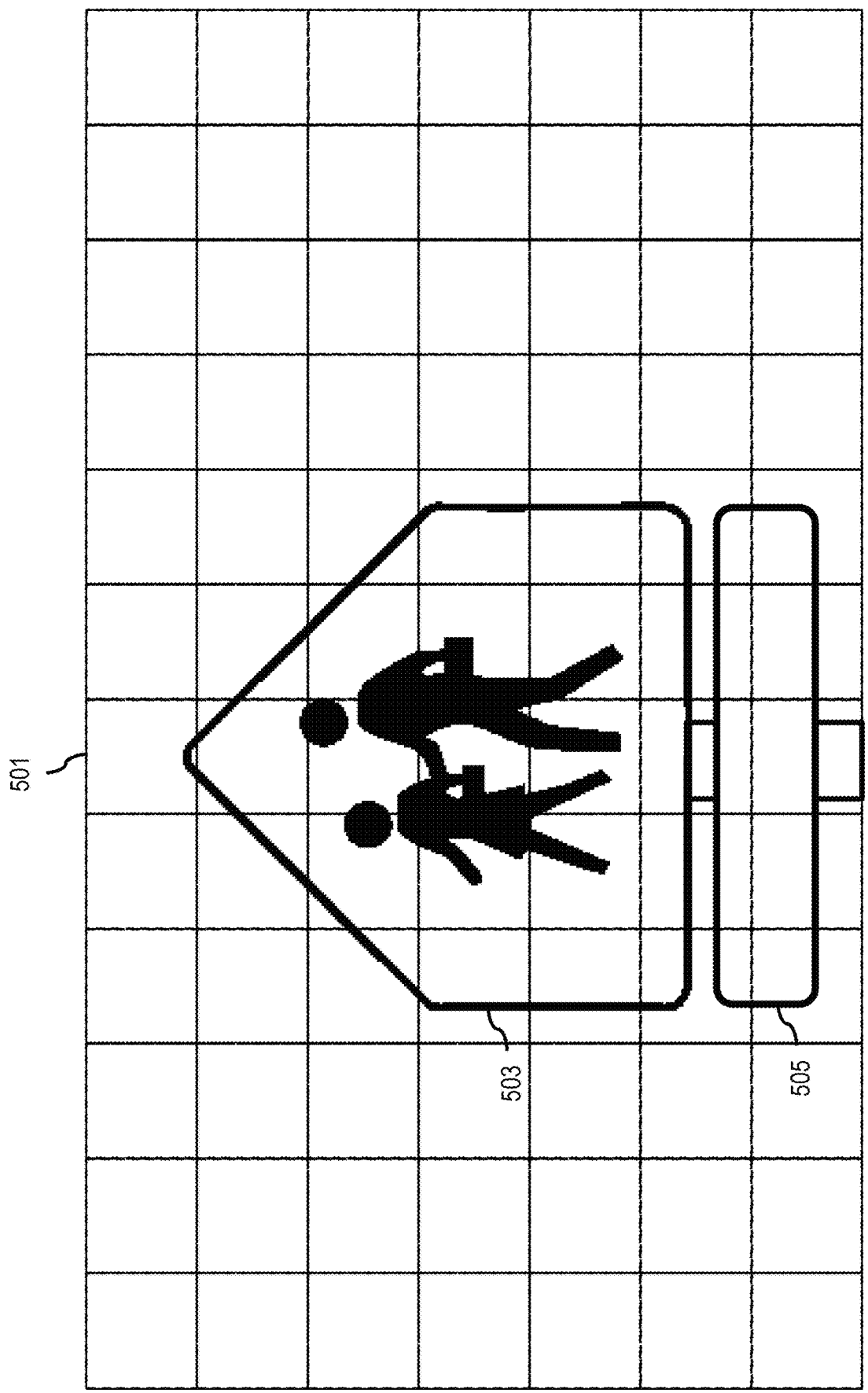
FIGS. 5A and 5B are diagrams illustrating an example of how a predicted object code can be used to find which grid cells are predicting features for the same object, according to one embodiment.
Figure 5B:
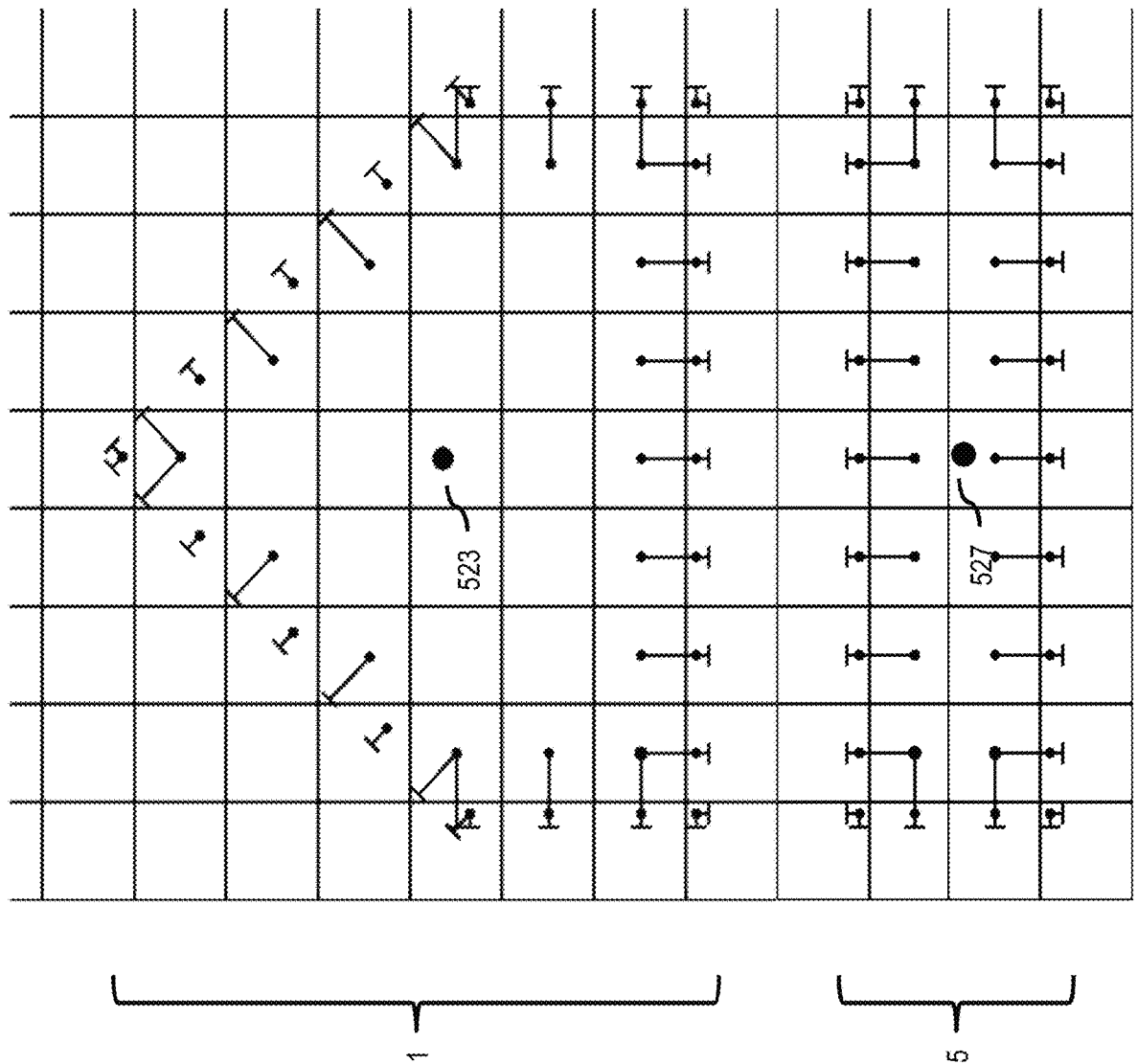

FIGS. 5A and 5B are diagrams illustrating an example of how a predicted object code can be used to find which grid cells are predicting features for the same object, according to one embodiment. In the example of FIGS. 5A and 5B, the redundant feature detection engine 303 of the machine learning system 103 has been trained to detect parametric representations of object edges (e.g., see below for a detailed description of the parametric representation) as well as an object code based on a centroid of a predicted polygon representing the object.

One could observe how the same edge is predicted several times making the system more robust.

FIG. 5A is a diagram of an input image 501 depicting a first sign 503 and a second sign 505 positioned closely and directly below the first sign 503. As a result, when the feature detection engine predicts or detects the sign edges for each grid cell, there can be potential confusion about which edge belongs to which cell, or even whether there are multiple cells depicted in the first place. To address this potential confusion, in one embodiment, the redundant feature detection engine 303 are also trained to predict a sign center when a sign edge is detected as described above. The predicted center or polygon centroid can then be used as an object code to uniquely identify the corresponding object. Each cell can use the image data available in the each of respective cells and/or a predetermined extent of neighboring cells (e.g., within 1.5 or 2 cell widths) to make a prediction of where the center of the sign is based on the detected sign edge to predict respective object codes. In one embodiment, the sign center can be indicated in the form of X, Y displacement from the cell center to the center of the sign. The predicted object code can then be included in the cell-based parametric representation as another parameter associated with each detected edge that is output from each grid cell.

In one embodiment, the feature detection engine 303 can use the predicted object code that is encoded for the parametric representation of each detected sign edge to cluster cells and/or their cell-based parametric representations that are predicting the same sign. For example, cell-based representations whose predicted object codes match. In one embodiment, the matching need not be exact and the object codes or the attributes underlying the object code can be matched to with a threshold value (e.g., a threshold distance for predicted centroid locations). In embodiments where more than simple matching is used to group or aggregate grid cells, this grouping can be based on traditional clustering approaches like the mean shift, DBSCAN, and/or equivalent algorithms.

FIG. 5B is a diagram of parametric representations of the multiple signs detected in the example of FIG. 5A, according to one embodiment. As shown in FIG. 5B, the feature detection engine 303 processes the input image of FIG. 5A to generate the parametric representation 520. In this example, each cell predicts an object code (e.g., a sign center) for each predicted edge as discussed above. The system 100 then clusters each of the parametric representations generated by each cell based on the predicted sign center. This clustering results in two clusters: a first cluster 521 of predicted edges with a predicted object code based on a hash of a predicted sign center 523, and a second cluster 525 of predicted edges with a predict object code based on a hash of a predicted sign center 527. The feature detection engine can then combine the predicted edge representations for each cluster 523 and 525 to output overall predicted edges for each of the corresponding detected signs 503 and 505 of FIG. 5A. As previously described, the feature detection engine can use any means to combine the individually predicted edges (e.g., mean, median, voting, etc.) to generate the feature prediction outputs for the signs 503 and 505.

As discussed above, one use case for a redundant feature detection engine 303 is for real-time and high-accuracy vehicle localization (e.g., localization to a more accurate position in a roadway such as in a specific lane), for instance, to support autonomous driving. Traditionally, most vehicle navigation systems have accomplished this localization using GPS, which generally provides a real-time location with a 95% confidence interval of 7.8 meters. However, in complicated urban environments, reflection of GPS signals can further increase this error, such that one's location may be off by as much as 30 meters. Given that the width of many lanes is 3-4 meters, this accuracy is not sufficient to properly localize a vehicle 101 (e.g., an autonomous vehicle) so that it can make safe route planning decisions. Other sensors, such as inertial measurement units (IMUs) can increase the accuracy of localization by taking into account vehicle movement, but these sensors tend to drift and still do not provide sufficient accuracy for localization.

Figure 6:
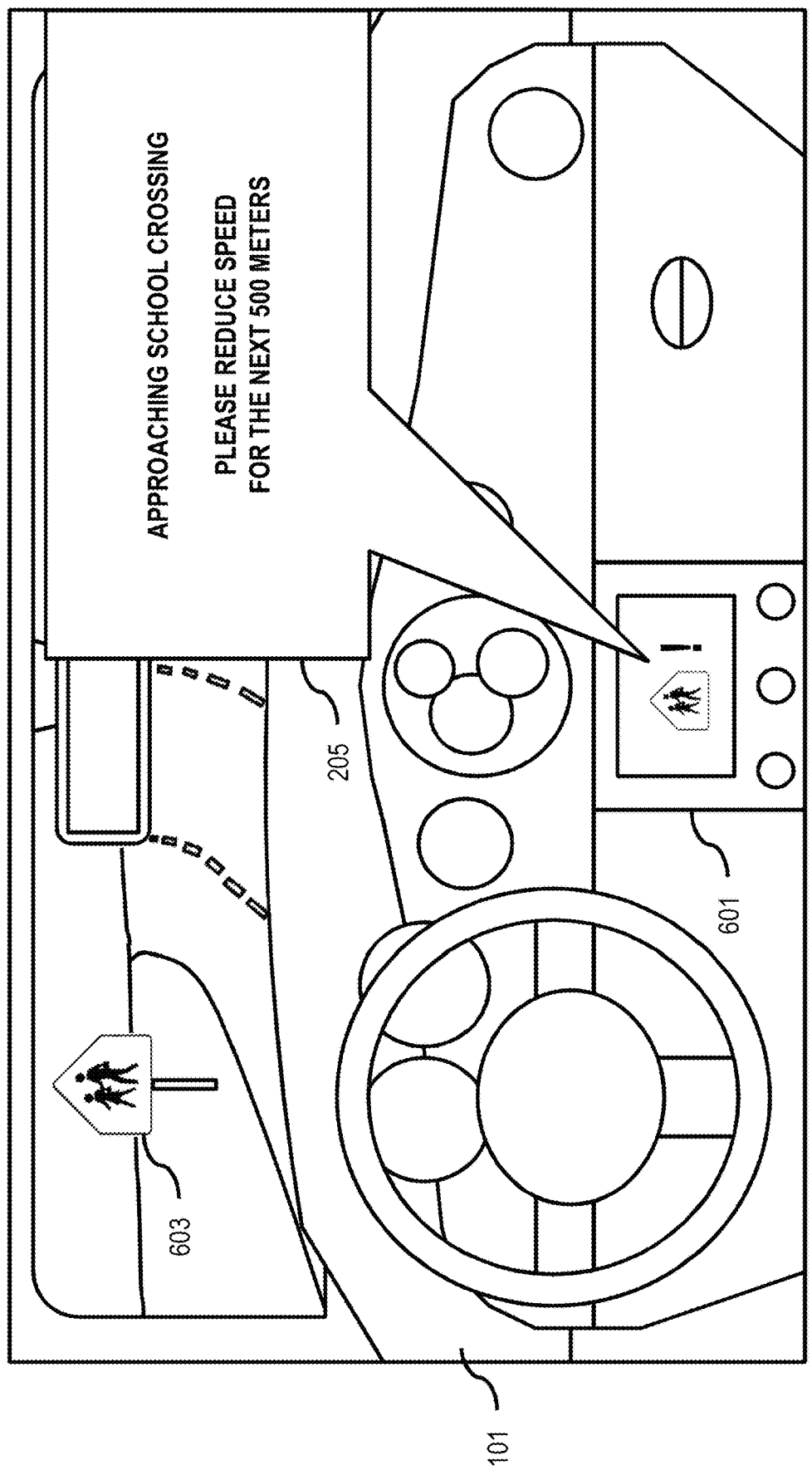
FIG. 6 is diagram illustrating example vehicle navigation system that can obtained environmental information and/or employ localization based on signs, according to one embodiment.

In general, a localization accuracy of around 10 cm is needed for safe driving in many areas. One way to achieve this level of accuracy is to use visual odometry, in which features (e.g., signs) are detected from imagery (e.g., using the machine learning system 103 in combination with the computer vision system 105). These features can then be matched to a database of features (e.g., indexed to an accurate location of the feature) to determine one's location. For example, FIG. 6 illustrates a vehicle 101 equipped with a navigation or autonomous vehicle control system 601 that employs an embodiment of a computer vision-based localization system as described herein. In this example, the vehicle control system 601 uses redundant feature detection engine 303 according to the embodiments described herein to detect a road sign 603 that indicates the vehicle 101 is approaching an upcoming school crossing. The vehicle control system 601 can either slow down autonomously or provide an alert to the driver of the vehicle 101 to manually slow down. By employing visual odometry with respect to the detected sign 603 based on the redundant feature detection engine 303, the control system 601 can more accurately localize a position of the vehicle 101 to enhance safety while traveling through the approaching school crossing.

Returning to FIG. 1, as shown, the system 100 includes the machine learning system 103 for providing a redundant feature detection engine according the various embodiments described herein. In some use cases, the system 100 can include the computer vision system 105 configured to use machine learning to detect objects or features depicted in images. For example, with respect to autonomous, navigation, mapping, and/or other similar applications, the computer vision system 105 can detect road features (e.g., lane lines, signs, etc.) in an input image and generate associated prediction confidence values, according to the various embodiments described herein. In one embodiment, the machine learning system 103 includes a neural network or other machine learning system to make predictions from a trained redundant feature detection engine 303 (e.g., a machine learning model). For example, when the input to the machine learning model are images used for visual odometry, the features of interest can include lane lines detected in the images to support localization of, e.g., a vehicle 101 within the sensed environment. In one embodiment, the neural network of the machine learning system 103 is a traditional convolutional neural network which consists of multiple layers of collections of one or more neurons (which are configured to process a portion of an input image such as a grid cell or receptive field). In one embodiment, the receptive fields of these collections of neurons (e.g., a receptive layer) can be configured to correspond to the area of an input image delineated by a respective a grid cell generated as described above.

In one embodiment, the machine learning system 103 and/or the computer vision system 105 also have connectivity or access to a geographic database 113 which stores the geofences or designated geographic areas for creating the evaluation and/or training datasets. In one embodiment, the geographic database 113 can also include representations of mapped geographic features to facilitate visual odometry to increase localization accuracy. In one embodiment, the machine learning system 103 and/or computer vision system 105 have connectivity over a communication network 115 to the services platform 109 that provides one or more services 111. By way of example, the services 111 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 111 uses the output of the machine learning system 103 and/or of the computer vision system 105 employing skip areas for machine learning (e.g., detected lane features) to localize the vehicle 101 or a user equipment 117 (e.g., a portable navigation device, smartphone, portable computer, tablet, etc.) to provide services 111 such as navigation, mapping, other location-based services, etc.

In one embodiment, the machine learning system 103 and/or computer vision system 105 may be a platform with multiple interconnected components. The machine learning system 103 and/or computer vision system 105 may include multiple servers, intelligent networking devices, computing devices, components and corresponding software for providing parametric representations of lane lines. In addition, it is noted that the machine learning system 103 and/or computer vision system 105 may be a separate entity of the system 100, a part of the one or more services 111, a part of the services platform 109, or included within the UE 117 and/or vehicle 101.

In one embodiment, content providers 119a-119m (collectively referred to as content providers 119) may provide content or data (e.g., including geographic data, parametric representations of mapped features, etc.) to the geographic database 113, the machine learning system 103, the computer vision system 105, the services platform 109, the services 111, the UE 117, the vehicle 101, and/or an application 121 executing on the UE 117. The content provided may be any type of content, such as map content, textual content, audio content, video content, image content, etc. In one embodiment, the content providers 119 may provide content that may aid in the detecting and classifying of lane lines and/or other features in image data, and estimating the quality of the detected features. In one embodiment, the content providers 119 may also store content associated with the geographic database 113, machine learning system 103, computer vision system 105, services platform 109, services 111, UE 117, and/or vehicle 101. In another embodiment, the content providers 119 may manage access to a central repository of data, and offer a consistent, standard interface to data, such as a repository of the geographic database 113.

In one embodiment, the UE 117 and/or vehicle 101 may execute a software application 121 to capture image data or other observation data for processing by the redundant feature detection engine according the embodiments described herein. By way of example, the application 121 may also be any type of application that is executable on the UE 117 and/or vehicle 101, such as autonomous driving applications, mapping applications, location-based service applications, navigation applications, content provisioning services, camera/imaging application, media player applications, social networking applications, calendar applications, and the like. In one embodiment, the application 121 may act as a client for the machine learning system 103 and/or computer vision system 105 and perform one or more functions associated with providing a redundant feature detection engine alone or in combination with the machine learning system 103.

By way of example, the UE 117 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 117 can support any type of interface to the user (such as "wearable" circuitry, etc.). In one embodiment, the UE 117 may be associated with the vehicle 101 or be a component part of the vehicle 101.

In one embodiment, the UE 117 and/or vehicle 101 are configured with various sensors for generating or collecting environmental image data (e.g., for processing by the machine learning system 103 and/or computer vision system 105), related geographic data, etc. In one embodiment, the sensed data represent sensor data associated with a geographic location or coordinates at which the sensor data was collected. In this way, the sensor data can act as observation data that can be separated into location-aware training and evaluation datasets according to their data collection locations. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 117 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 117 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 117 and/or vehicle 101 may include GPS or other satellite-based receivers to obtain geographic coordinates from satellites 123 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the machine learning system 103, computer vision system 105, services platform 109, services 111, UE 117, vehicle 101, and/or content providers 119 communicate with each other and other components of the system 100 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIGS. 7-9B are provided as examples of a process for generating a parametric representation of the detected edges of objects (e.g., a sign) depicted in input images using the redundant feature detection engine, according to one embodiment. Accordingly, in addition to the predicted object codes of each grid cell, the redundant feature detection engine can output the predicted edges or any other learned feature of the image as its feature prediction output.

Figure 7:
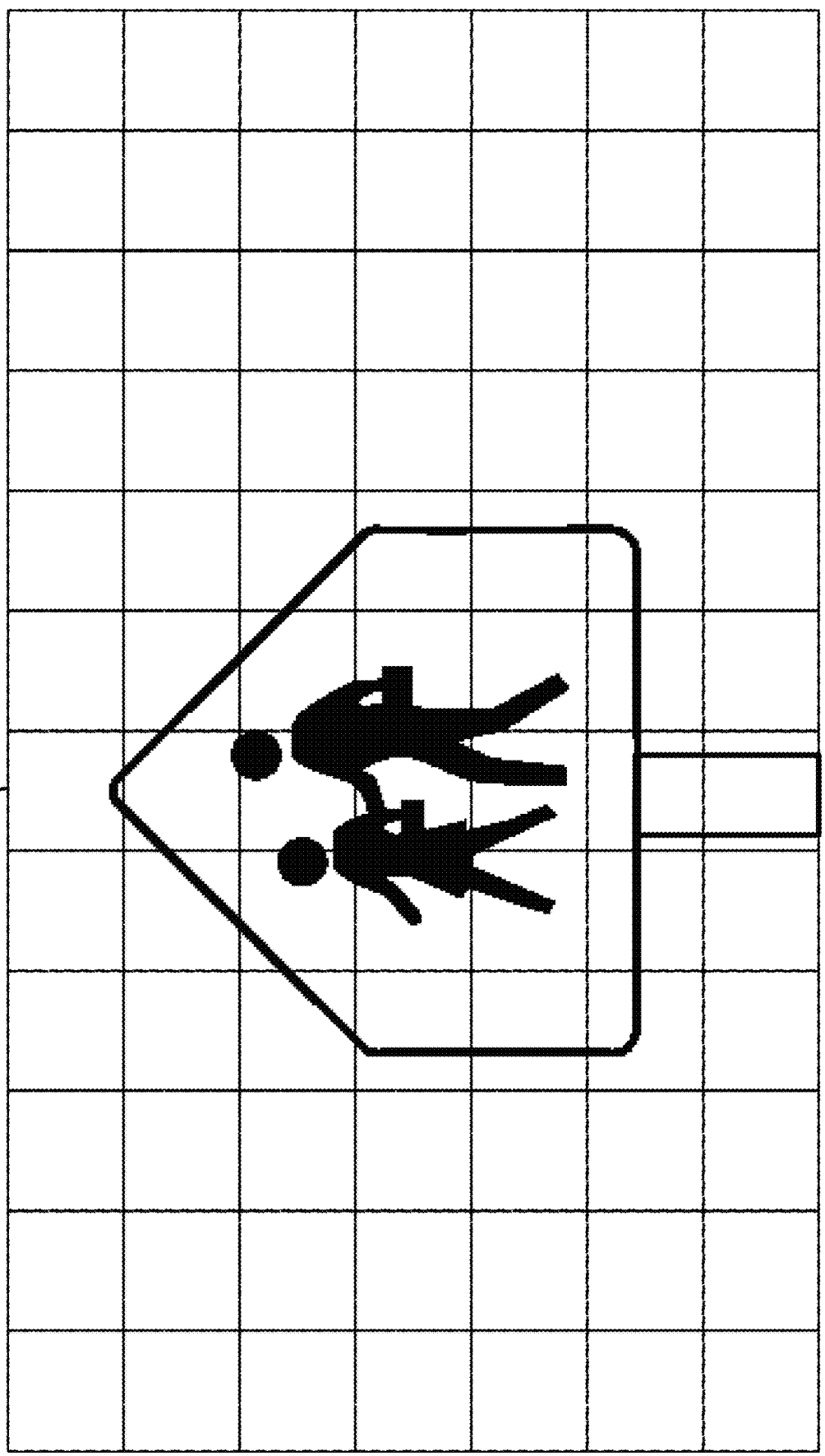
FIG. 7 is a diagram of an input image overlaid with a grid, according to one embodiment.

For example, as shown in FIG. 7 a grid 701 segments an input image (into individual grid cells. In one embodiment, such a grid can be output by a fully convolutional neural network, which has the advantage of being computationally fast without having an excess of parameters that might lead to overfitting. For example, with respect to a neural network or other equivalent machine learning system, each of the cells of the grid 701 can be processed by a different neuron or processing node to more efficiently employ the available neurons or nodes, and distribute the computational load for processing the entire input image. In other words, in one layer of the neural network, the scope of each neuron corresponds to the extent of the input image area within each respective grid cell. Each neuron or node can make is prediction (e.g., detection of an edge or face of an object such as a sign) for each individual grid cell, thereby advantageously avoiding the computational resource burden associated having only one central cell processing the image data for the entire sign, or having to have a fully connected layer.

In one embodiment, the input image of FIG. 7 is captured in real-time by a camera sensor or equivalent mounted on the vehicle 101 as raster images at a predetermined pixel resolution. In one embodiment, the input image can be captured using cameras sensitive to visible light, infra-red, and/or any other wavelength of light. To support real-time operation, the input image can be part of an image stream captured at a relatively high frequency (e.g., 20 Hz, 30 Hz, or higher). Each frame of the image stream can then be processed to provide real-time detection of signs.

Figure 8:
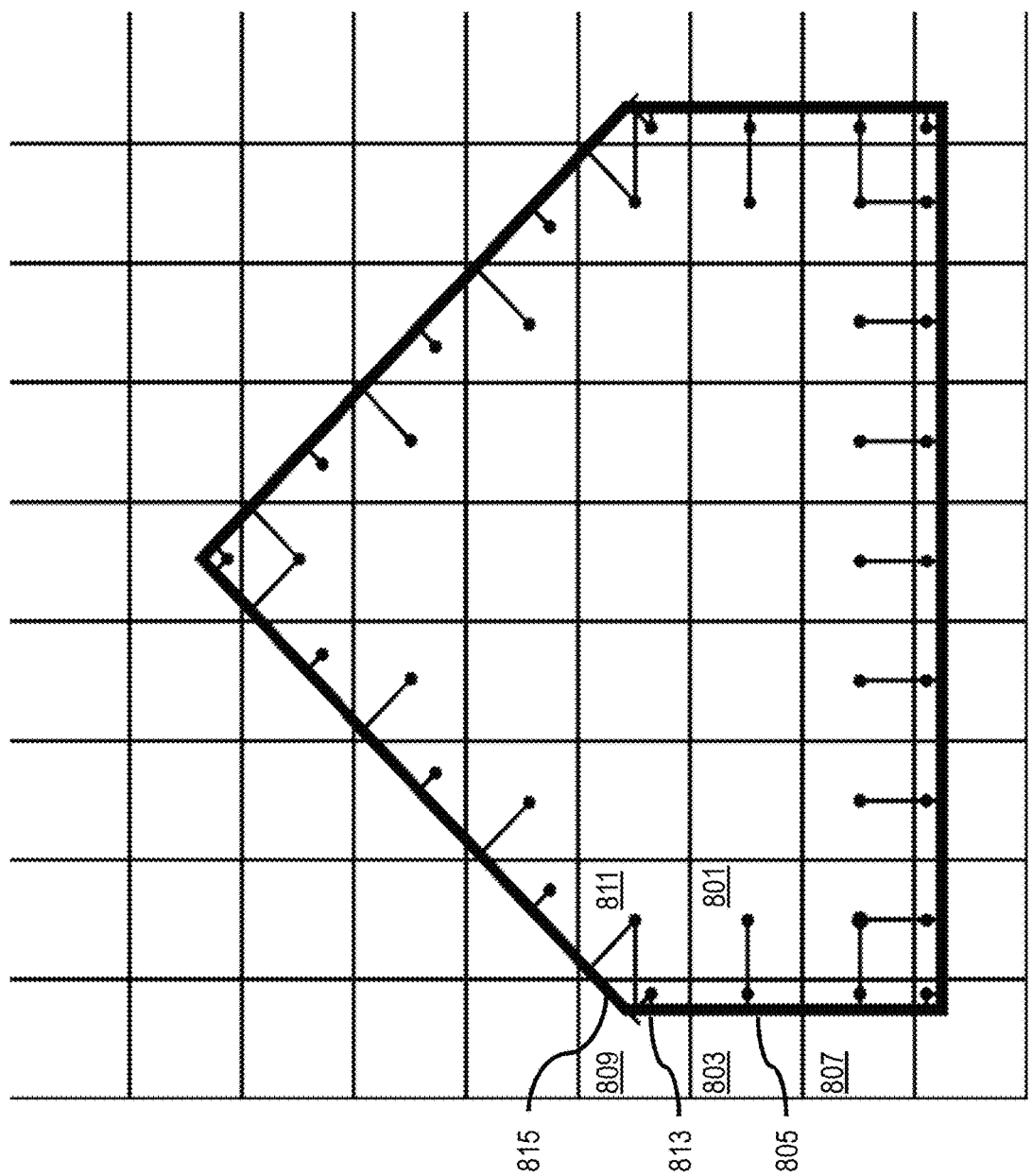
FIG. 8 is a diagram illustrating a grid-based processing of an input image to independently detected sign edges, according to one embodiment.

In one embodiment, as shown in FIG. 8, cells or associated processing nodes are responsible for predicting only nearby line segments. By way of example, the system 100 can configure a threshold distance for determining whether a cell is nearby or proximate to a given line segment or edge of a sign. In one embodiment, distance is measured with respect to the grid dividing the input image. As noted above, when an input image is divided into grid cells, the system 100 also designates processing nodes or neurons for processing the image data in that cell. In one embodiment, a processing node or cell can also process image data from other cells that are passed to the cell (e.g., as described with passing image data to a central node when that central node is responsible for processing image data for the entire sign as described above). In this way any cell that is within the threshold distance of an edge of a sign can independently make a prediction of the attributes of the edge (e.g., position, angle, predicted sign center, etc.), so that when multiple nearby cells make a prediction, multiple predictions can be processed to determine a more robust overall prediction. In one embodiment, "independently" refers to a cell or processing node making its own prediction based on the portion of the image data within its scope (e.g., the portion of the input image falling within the grid cell to which it is assigned, and/or the portion of the input image falling in the nearby cells within the distance threshold).

In the example of FIG. 8, the system 100 is configured with a distance threshold of 1.5 cells, so that a given cell or processing node will process the image data from its cell and any cells within 1.5 cell widths to detect any sign edges, sign faces, etc. As shown, the processing node of cell 801 processes the image data contained in the cell 801 (e.g., no edge detected) as well as the image data in neighboring cell 803 which falls within 1.5 cell widths. In this example, an edge is detected in cell 803 by cell 801. In addition, the processing node of cell 803 will process the image data in its cell 803 and will also output a prediction with respect to the edge 805. Accordingly, there are at least two independent predictions of the edge 805 (e.g., by cells 801 and 803) to provide for redundant results. To correlate the redundant results, the redundant feature prediction 303 also outputs a predicted object code for each cell, which can then be aggregated according to the various embodiments described herein. For example, other predictions of the edge 805 may also be provided by other neighboring cells (e.g., cells 807 and 809) which can then be correlated using the respectively predicted object codes.

In one embodiment, cells that are close to more than one edge are responsible for predicting multiple edges. For example, the processing node of cell 811 is within the threshold distance of edges 813 and 815. The node of cell 811, therefore, will make a prediction of the position, angle, etc. of both edges 813 and 815. Each of the other cells in the grid performs the same prediction process to cover the entire image to collectively predict a parametric representation of the entire sign from the individual and independent parametric representations (e.g., a cell-based parametric representation) for each individual grid cell as shown in FIG. 8.

Figure 9A:
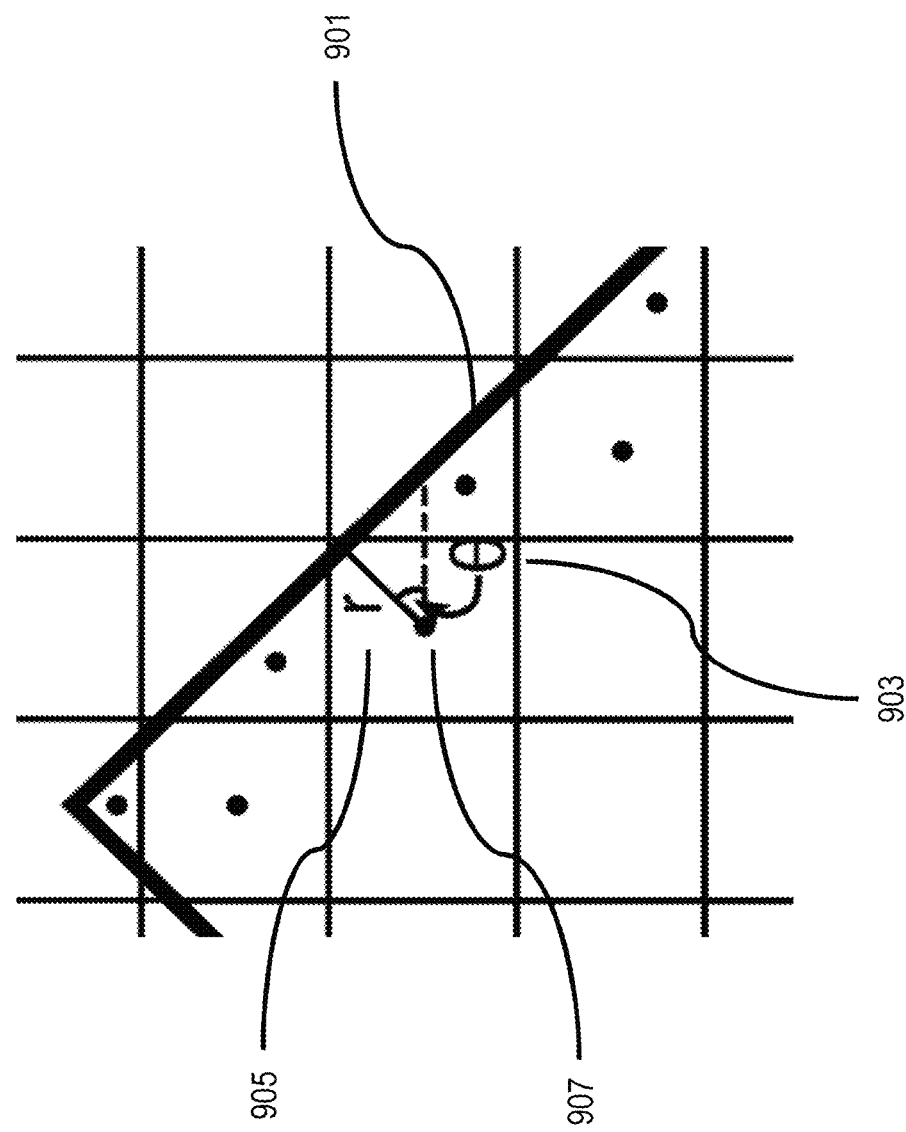
FIG. 9A is a diagram illustrating a parametric representation of a detected object edge, according to one embodiment.

FIG. 9A is a diagram illustrating a parametric representation of a detected object edge, according to one embodiment. In one embodiment, the system 100 encodes a detected object edge (e.g., a sign edge) in each cell as parameters representing at least a location and angle of the predicted edge in a parametric representation of the edge. In one embodiment, the system 100 determines and includes a confidence level for the detected edge as an additional parameter of the parametric representation. By way of example, the location and angle of the predicted edge can be indicated using an r-theta representation of the line with respect to a reference point and/or a reference angle for each grid cell. It is noted that r-theta representation is provided by way of illustration, and not as a limitation. It is contemplated that any equivalent system for indicating a line segment in a grid cell can be used according to the various embodiments described herein.

In an example using an r-theta representation as shown in FIG. 9A, the prediction of each edge (e.g., edge 901) can be encoded as three values: a confidence (not shown), an angle 903, and a radius 905. In one embodiment, the confidence value is 1 if the edge exists and 0 otherwise. In one embodiment, during prediction by the redundant feature detection engine 303 (e.g., a neural network), the confidence values are probabilities that a detected edge is a sign or object edge (e.g., 0 corresponding to zero probability of being a sign edge, 1 corresponding to a highest probability of being an edge, and other values spanning the range to indicate different probabilities). To calculate the radius 905 and angle 903, the centroid 907 of the intersection of the object (e.g., a sign face) and the cell is first calculated to represent a reference point for the grid cell. By using the centroid 907 of the intersection (e.g., the portion of the image area in each cell that corresponds to the object's face) as the reference point, the centroid is ensured to be located on the object face as opposed to a non-object portion of the image area. A line segment is drawn from the centroid 907 to the object edge 901 such that it is perpendicular to the edge 901. The angle 903 (e.g., angle θ) is then the angle 903 that this line makes with a reference angle, and the radius 905 is the length of the segment.

Figure 9B:
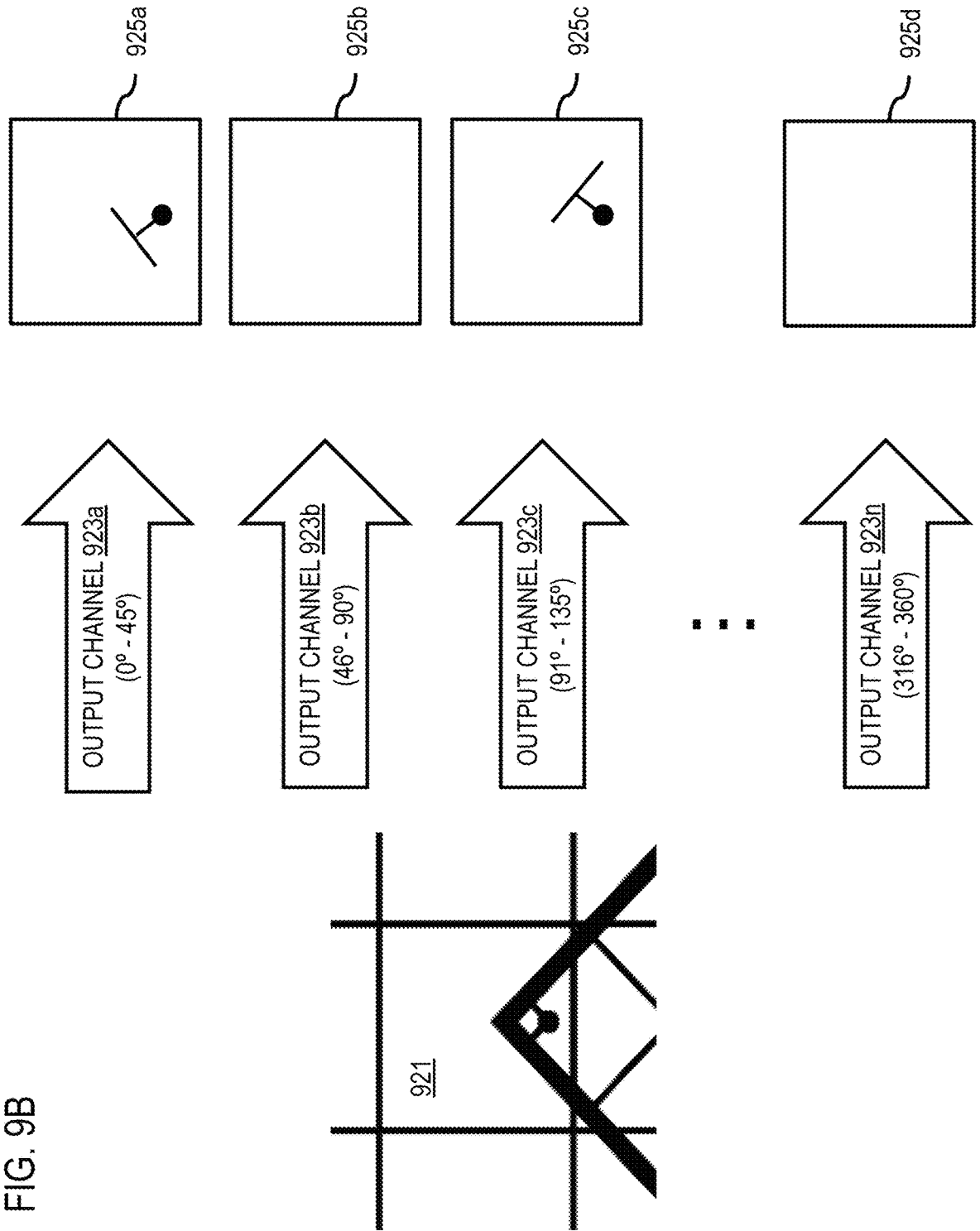
FIG. 9B is a diagram illustrating a multi-channel output of a parametric representation of detected sign edges, according to one embodiment.

In one embodiment, the three values discussed above can be used to encode any line segment. In another embodiment, as shown in FIG. 9B, that redundant feature detection engine 303 can provide multiple such output channels 923a-923n (also collectively referred to as output channels 923) from each cell that are each responsible for a certain angular range. For example, a cell 921 could have output channels 923a-923n, each with a confidence, a radius, and an angle for any detected edge that falls within the angular range for the corresponding output channel 923. The first such output (e.g., output channel 923a) would be responsible for edges with angles between 0 and 45 degrees, the second (e.g., output channel 923b) between 46 and 90 degrees, and so on. These ranges are provided by way of illustration and not as limitation. It is contemplated that the feature detection engine 303 can use any number of ranges (including just one range covering 0 to 360 degrees) that respectively span any angular range. This arrangement advantageously makes each output channel 923 an expert detector of lines that fall within a certain angular range. For example, narrower angular ranges for each output channel can enable each corresponding edge detector to become more specialized through machine learning, but can also increase complexity by increasing the overall number of detectors.

In one embodiment, the feature detection engine 303 can be trained to predict any other attributes of the detected object edge. For example, such additional attributes can include, but are not limited to: (1) whether an object face has any internal edges (e.g., for signs with internal openings or other complex shapes such as concave polygons); (2) a surface color of an object; (3) variability of the object (e.g., changes based on time of day); (3) temporary versus permanent objects; and/or (4) any other rich information describing the object, object face, object edges, etc.

Although, the examples of parametric representations of objects described herein are discussed with respect to a two-dimensional grid, it is contemplated that the various embodiments described herein are also applicable to higher dimensional object representations and images. For example, the feature predictions of objects (e.g., object edges or surfaces) can be applied to an n-dimensional space, wherein n≥2, by representing the detected edges as a n−1 dimensional hyperplane.

Figure 10:
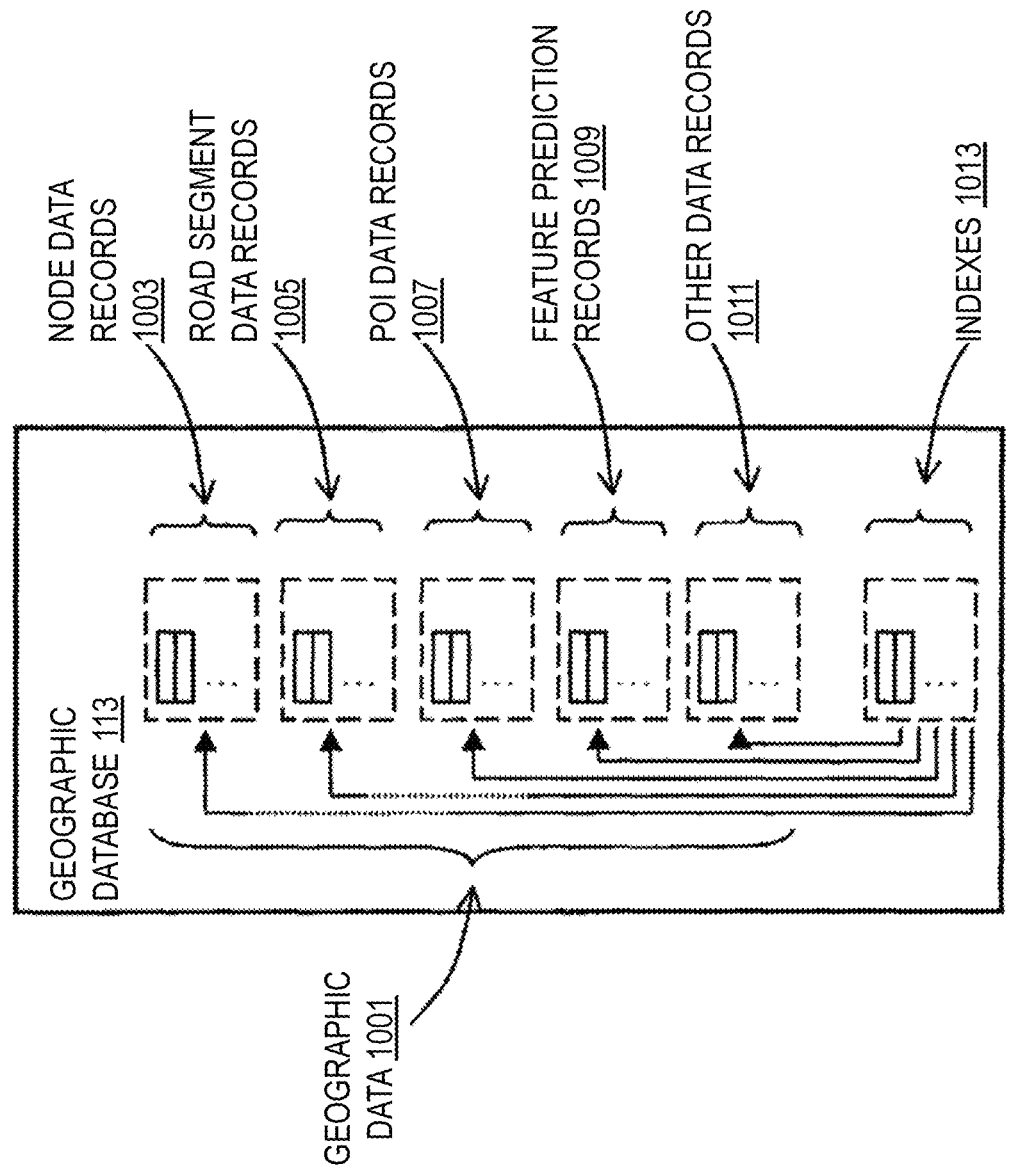
FIG. 10 is a diagram of a geographic database, according to one embodiment.

FIG. 10 is a diagram of a geographic database, according to one embodiment. In one embodiment, the geographic database 113 includes geographic data 1001 used for (or configured to be compiled to be used for) mapping and/or navigation-related services, such as for video odometry based on the parametric representation of signs include, e.g., encoding and/or decoding parametric representations into object models of signs. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 113 includes node data records 1003, road segment or link data records 1005, POI data records 1007, feature prediction records 1009, other records 1011, and indexes 1013, for example. More, fewer or different data records can be provided. In one embodiment, additional data records (not shown) can include cartographic ("carto") data records, routing data, and maneuver data. In one embodiment, the indexes 1013 may improve the speed of data retrieval operations in the geographic database 113. In one embodiment, the indexes 1013 may be used to quickly locate data without having to search every row in the geographic database 113 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points corresponding to the respective links or segments of the road segment data records 1005. The road link data records 1005 and the node data records 1003 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 1007. The geographic database 113 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 113 can also include feature prediction records 1009 for storing predicted object codes, parametric representations of the objects detected from input image data, and/or related data generated according to the various embodiments described herein for providing a redundant feature detection engine. In one embodiment, the parametric representation records 1009 can be associated with one or more of the node records 1003, road segment records 1005, and/or POI data records 1007 to support localization or visual odometry based on the features stored therein and the generated parametric representations of detected objects of the records 1009. In this way, the object codes and/or corresponding predicted attributes stored in the feature prediction records 1009 can also be associated with the characteristics or metadata of the corresponding record 1003, 1005, and/or 1007.

In one embodiment, the geographic database 113 can be maintained by the content provider 119 in association with the services platform 109 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 117) along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 117, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a redundant feature detection engine may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
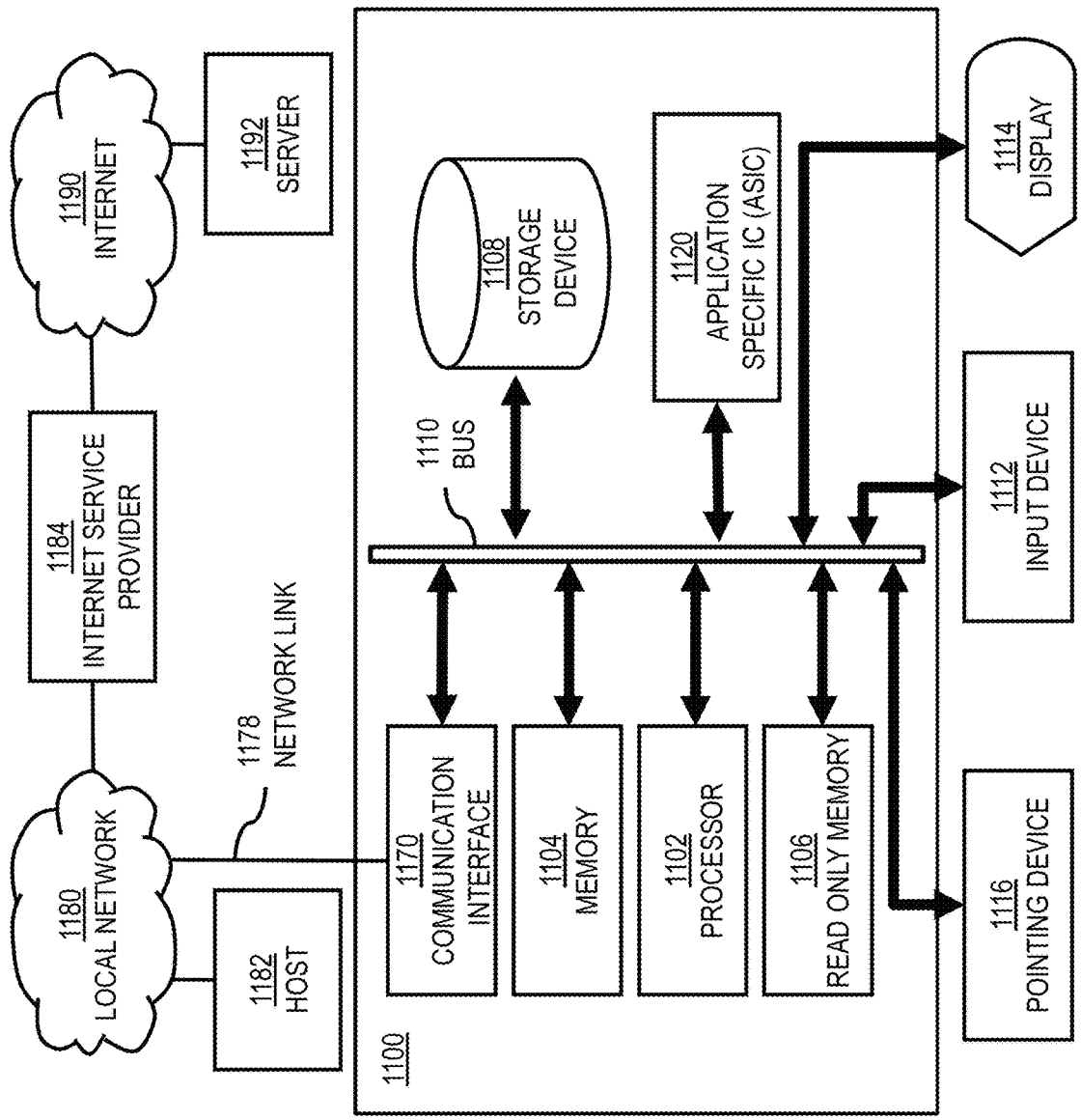
FIG. 11 is a diagram of hardware that can be used to implement an embodiment of the invention.

FIG. 11 illustrates a computer system 1100 upon which an embodiment of the invention may be implemented. Computer system 1100 is programmed (e.g., via computer program code or instructions) to provide a redundant feature detection engine as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing a redundant feature detection engine. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for providing a redundant feature detection engine. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing a redundant feature detection engine, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general, the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 115 for providing a redundant feature detection engine.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 12 illustrates a chip set 1200 upon which an embodiment of the invention may be implemented. Chip set 1200 is programmed to provide a redundant feature detection engine as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide a redundant feature detection engine. The memory 1205 also stores the data associated with or generated by the execution of the inventive steps.

Figure 13:
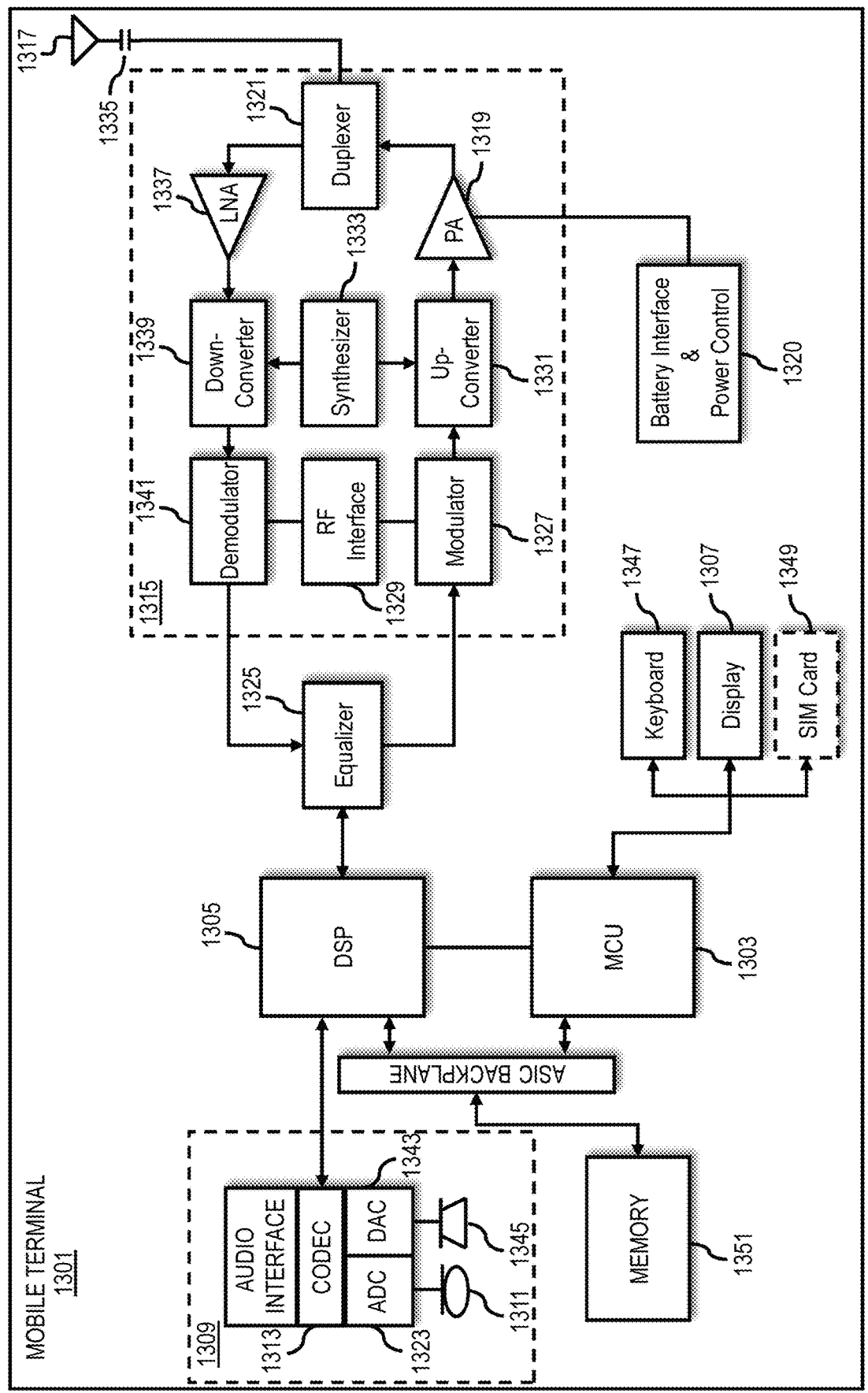
FIG. 13 is a diagram of a mobile terminal (e.g., handset) that can be used to implement an embodiment of the invention.

FIG. 13 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to provide a redundant feature detection engine. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for identifying objects in imaging comprising:
   segmenting an input image into a plurality of grid cells for processing by a redundant feature detection engine, the redundant feature detection engine including a neural network;
   initiating a prediction of an object code by the redundant feature detection engine for one or more cells of the plurality of grid cells to create a list of object codes associated with the input image, wherein the object code is a predicted feature that uniquely identifies an object depicted in the input image; and
   determining a count of unique object codes in the list of object codes.

2. The method of claim 1, further comprising:
   estimating a number of unique objects depicted in the input image based on the count of unique object codes.

3. The method of claim 1, further comprising:
   determining a geographic area associated with the input image; and
   determining a number of detectable objects in the geographic area based on the count of unique object codes.

4. The method of claim 3, wherein the detectable objects include one or more localization objects.

5. The method of claim 3, further comprising:
   determining whether to rely on the detectable objects for localization based on the number of detectable objects.

6. The method of claim 5, wherein the determining of whether to rely to rely on the detectable objects for localization is further based on how many detections of the detectable objects were found in the input image.

7. The method of claim 5, wherein the determining of whether to rely to rely on the detectable objects for localization is further based on a predicted feature of the one or more detectable objects.

8. An apparatus for identifying objects in imaging comprising:
   at least one processor; and
   at least one memory including computer program code for one or more programs,
   the at least one memory and the computer program code configured to, with the at least one processor, cause the apparatus to perform at least the following,
     segment an input image into a plurality of grid cells for processing by a redundant feature detection engine, the redundant feature detection engine including a neural network;
     initiate a prediction of an object code by the redundant feature detection engine for one or more cells of the plurality of grid cells to create a list of object codes associated with the input image, wherein the object code is a predicted feature that uniquely identifies an object depicted in the input image; and
     determine a count of unique object codes in the list of object codes.

9. The apparatus of claim 8, further comprising:
   estimating a number of unique objects depicted in the input image based on the count of unique object codes.

10. The apparatus of claim 8, further comprising:
    determining a geographic area associated with the input image; and
    determining a number of detectable objects in the geographic area based on the count of unique object codes.

11. The apparatus of claim 10, wherein the detectable objects include one or more localization objects.

12. The apparatus of claim 10, further comprising:
    determining whether to rely on the detectable objects for localization based on the number of detectable objects.

13. The apparatus of claim 12, wherein the determining of whether to rely to rely on the detectable objects for localization is further based on how many detections of the detectable objects were found in the input image.

14. The apparatus of claim 12, wherein the determining of whether to rely to rely on the detectable objects for localization is further based on a predicted feature of the one or more detectable objects.

15. A non-transitory computer-readable storage medium for identifying objects in imaging, carrying one or more sequences of one or more instructions which, when executed by one or more processors, cause an apparatus to perform:

segmenting an input image into a plurality of grid cells for processing by a redundant feature detection engine, the redundant feature detection engine including a neural network;

initiating a prediction of an object code by the redundant feature detection engine for one or more cells of the plurality of grid cells to create a list of object codes associated with the input image, wherein the object code is a predicted feature that uniquely identifies an object depicted in the input image; and determining a count of unique object codes in the list of object codes.

16. The non-transitory computer-readable storage medium of claim 15, wherein the apparatus is caused to further perform:

estimating a number of unique objects depicted in the input image based on the count of unique object codes.

17. The non-transitory computer-readable storage medium of claim 15, wherein the apparatus is caused to further perform:

determining a geographic area associated with the input image; and determining a number of detectable objects in the geographic area based on the count of unique object codes.

18. The non-transitory computer-readable storage medium of claim 17, wherein the detectable objects include one or more localization objects.

19. The non-transitory computer-readable storage medium of claim 17, wherein the apparatus is caused to further perform:

determining whether to rely on the detectable objects for localization based on the number of detectable objects.

20. The non-transitory computer-readable storage medium of claim 19, wherein the determining of whether to rely to rely on the detectable objects for localization is further based on how many detections of the detectable objects were found in the input image.

* * * * *